(12) United States Patent
West

(10) Patent No.: US 11,435,013 B2
(45) Date of Patent: Sep. 6, 2022

(54) AIRCRAFT FUEL TANK ISOLATOR

(71) Applicant: AIRBUS OPERATIONS LIMITED, Bristol (GB)

(72) Inventor: Nicholas West, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 0 days.

(21) Appl. No.: 17/362,952

(22) Filed: Jun. 29, 2021

(65) Prior Publication Data

US 2021/0324974 A1 Oct. 21, 2021

Related U.S. Application Data

(63) Continuation of application No. 16/366,128, filed on Mar. 27, 2019, now Pat. No. 11,079,044.

(30) Foreign Application Priority Data

Mar. 29, 2018 (GB) ..................... 1805237

(51) Int. Cl.
| | |
|---|---|
| *F16L 5/08* | (2006.01) |
| *B64D 37/00* | (2006.01) |
| *F16L 25/02* | (2006.01) |
| *B64D 37/32* | (2006.01) |
| *B64D 45/02* | (2006.01) |
| *F16L 5/10* | (2006.01) |

(52) U.S. Cl.
CPC ............... *F16L 5/08* (2013.01); *B64D 37/00* (2013.01); *B64D 37/005* (2013.01); *B64D 37/32* (2013.01); *B64D 45/02* (2013.01); *F16L 25/02* (2013.01); *F16L 5/10* (2013.01)

(58) Field of Classification Search
CPC ........................................................ F16L 5/08
See application file for complete search history.

(56) References Cited

U.S. PATENT DOCUMENTS

| | | | |
|---|---|---|---|
| 2,813,692 A | 11/1957 | Bremer et al. | |
| 5,664,809 A | 9/1997 | Bates | |
| 9,147,988 B2 | 9/2015 | Baur et al. | |
| 2006/0267339 A1* | 11/2006 | Kunkel | F16L 5/08 |
| | | | 285/189 |
| 2007/0145190 A1 | 6/2007 | Villegas et al. | |
| 2012/0326431 A1* | 12/2012 | Irwin | F16L 5/06 |
| | | | 228/101 |
| 2013/0099067 A1 | 4/2013 | Hansom et al. | |

(Continued)

FOREIGN PATENT DOCUMENTS

| | | |
|---|---|---|
| EP | 3 103 724 | 12/2016 |
| GB | 2542121 | 3/2017 |

*Primary Examiner* — Hung V Ngo
(74) *Attorney, Agent, or Firm* — Nixon & Vanderhye P.C.

(57) ABSTRACT

An isolator for an aircraft fuel tank configured to separate an electrically conductive internal panel of the fuel tank from an electrically conductive pipe that passes through the panel. The isolator includes: a plurality of first attachment points for attaching the isolator to the panel, a plurality of second attachment points for attaching the isolator to the pipe, and an aperture defined by an outer wall and extending from a first side of the isolator to a second side of the isolator. The aperture is configured to receive the pipe in use, wherein the isolator is formed of a non-electrically conductive material.

17 Claims, 3 Drawing Sheets

(56) References Cited

U.S. PATENT DOCUMENTS

2014/0232103 A1    8/2014  Waugh
2015/0260317 A1    9/2015  Yamamoto et al.
2016/0356403 A1  12/2016  Perrigo et al.
2017/0370504 A1* 12/2017  Li ............................ H05H 1/46
2018/0363850 A1* 12/2018  Cheatham ................. F17C 5/06

* cited by examiner

AIRCRAFT FUEL TANK ISOLATOR

RELATED APPLICATIONS

This application is a continuation of U.S. patent application Ser. No. 16/366,128, filed Mar. 27, 2019, which claims priority to United Kingdom patent application GB 1805237.3 filed Mar. 29, 2018, the entirety of each of these applications is incorporated by reference.

TECHNICAL FIELD

The present invention relates to an isolator for an aircraft fuel tank, an isolating system, a method and an aircraft.

BACKGROUND

In some aircraft, the aircraft fuel tanks have an irregular shape. The fuel tanks therefore typically comprise a plurality of segments defined by segment walls, or panels. The panels may extend substantially vertically between the top of the wing and the bottom of the wing. For example, in some aircraft the fuel tanks are located in the aircraft wings and are positioned around other equipment located in the wing. Some other equipment, for example located in the wing, may be connected to the fuselage of the aircraft via pipes that pass through the aircraft fuel tank. In some instances, the pipes pass through the panels of the fuel tank. For example, the pipes may carry hydraulic fluid from a hydraulic supply to a hydraulic actuator. In some instances, the pipes must pass through the segment walls.

SUMMARY

A first aspect of the present invention provides an isolator for an aircraft fuel tank, the isolator configured to separate an electrically conductive internal panel of the fuel tank from an electrically conductive pipe that passes through the panel, the isolator comprising: a plurality of first attachment points for attaching the isolator to the panel, a plurality of second attachment points for attaching the isolator to the pipe, and an aperture defined by an outer wall and extending from a first side of the isolator to a second side of the isolator, the aperture configured to receive the pipe in use, wherein the isolator comprises a non-electrically conductive material.

Optionally, the outer wall of the aperture extends outwardly from the first side of the isolator to form a tube, wherein the tube is configured to pass through the panel in use.

Optionally, the plurality of first attachment points and the plurality of second attachment points are positioned on a flange extending from the outer wall of the aperture.

Optionally, the first attachment points comprise a counterbore extending from the second side of the isolator to the first side of the isolator, wherein the wider end of the counterbore extends from the second side of the isolator.

Optionally, the first attachment points are positioned around the aperture to align with corresponding panel apertures in the panel.

Optionally, the second attachment points comprise a counterbore extending from the first side of the isolator to the second side of the isolator, wherein the wider end of the counterbore extends from the first side of the isolator.

Optionally, the second attachment points are positioned around the aperture to align with corresponding fitting apertures in a pipe fitting fixed to the pipe.

Optionally, the isolator comprises a groove on the first side and/or the second side of the isolator, the groove extending around the outer wall of the aperture and configured to receive a seal.

Optionally, the isolator is formed from a chemically inert material.

A second aspect of the present invention provides an isolation system comprising: an isolator according to the first aspect of the present invention, a plurality of first bolts, wherein each bolt of the plurality of first bolts is positioned in the counterbore of a respective one of the plurality of first attachments of the isolator, and a plurality of second bolts, wherein each bolt of the plurality of second bolts is positioned in the counterbore of a respective one of the plurality of second attachments of the isolator.

Optionally, wherein at least one of the plurality of first and second bolts are electrically-conductive, the system comprising a non-electrically conductive sealant covering the head of the at least one of the plurality of first and second bolts to seal the head of each bolt in its respective counterbore.

Optionally, the isolation system comprises a seal in a groove of the isolator, the seal surrounding the outer wall of the aperture.

A third aspect of the present invention provides a method of isolating an electrically conductive internal panel or an aircraft fuel tank from an electrically conductive pipe that passes through the panel, the method comprising: passing the pipe through a tube of a non-electrically conductive material isolator, passing the tube through an aperture in the panel, rigidly attaching the isolator to a pipe fitting fixed to the pipe, and rigidly attaching the isolator to the panel.

Optionally, the method comprises: rigidly attaching the isolator to a pipe fitting fixed to the pipe with an electrically-conductive first fastener, electrically insulating the first fastener from the panel, rigidly attaching the isolator to the panel with an electrically-conductive second fastener, and electrically insulating the second fastener from the pipe.

Optionally, the method comprises providing a seal between the isolator and the panel. Optionally, the seal is a liquid gasket.

A fourth aspect of the present invention provides as aircraft comprising: as isolator according to the first aspect of the present invention, or an isolation system according to the second aspect of the present invention.

BRIEF DESCRIPTION OF THE DRAWINGS

Embodiments of the invention will now be described, by way of example only, with reference to the accompanying drawings, in which.

DETAILED DESCRIPTION

There can be a build-up of static electricity in an aircraft fuel tank, and/or the aircraft may be struck by lightning. In some aircraft, the panels and the pipes comprise or are formed from an electrically conductive material and may therefore carry an electrical current. Accordingly, it can be beneficial to isolate a panel from a pipe to prevent an electrical current from passing between the panel and pipe.

Figure 1:
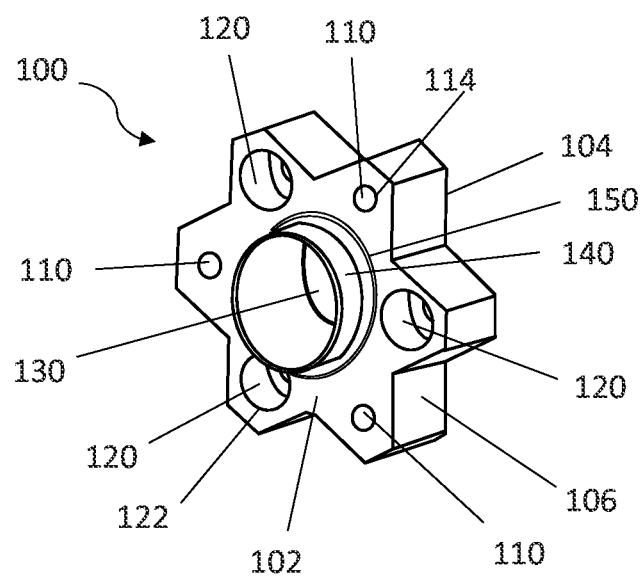
FIG. 1 shows a schematic isometric view of an isolator according to embodiments of the present invention.

FIG. 1 shows an isometric view of an isolator 100 according to embodiments of the present invention. The isolator 100 is for an aircraft fuel tank and is configured to separate an electrically conductive internal panel of the fuel tank from an electrically conductive pipe that passes through the panel.

The isolator 100 comprises a plurality of first attachment points 110 for attaching the isolator 100 to the panel, a plurality of second attachment points 120 for attaching the isolator 100 to the pipe, and an aperture 130 defined by an outer wall 140 and extending from a first side 102 of the isolator 100 to a second side 104 of the isolator 100. The aperture 130 is configured to receive the pipe in use.

In some embodiments, the outer wall 140 of the aperture 130 extends outwardly from the first side 102 of the isolator 100 to form a tube. The tube is configured to pass through the panel in use. In some embodiments, the outer wall 140 extends from the first side 102 of the isolator 100 by a distance that is greater than a thickness of the panel. The length of the tube is greater than a thickness of the isolator 100. That is, the length of the tube is greater than the distance between the first side 102 of the isolator 100 and the second side 104 of the isolator 100.

In some embodiments, the plurality of first attachment points 110 and the plurality of second attachment points 120 are positioned on a flange 106 extending from the outer wall 140 of the aperture 130. The flange 106 may define the first side 102 and the second side 104 of the isolator 100. The flange 106 of the isolator 100 shown in FIG. 1 is chamfered around the first and second attachment points 110, 120. This can help to reduce the size and therefore weight of the isolator 120.

In some embodiments, the first attachment points 110 are configured to receive a fastener (not shown) for fastening the isolator to the panel and/or the second attachment points 120 may be configured to receive a fastener (not shown) for fastening the isolator to the pipe.

In some embodiments, the first attachment points 110 are positioned around the aperture 130 to align with corresponding panel apertures in the panel (not shown). In some embodiments, the second attachment points 120 are positioned around the aperture 130 to align with corresponding fitting apertures in a pipe fitting fixed to the pipe (not shown). The isolator 100 shown in FIG. 1 has three first attachment points 110 each at a first radial distance from the aperture 130 and three second attachment points 120 each at a second radial distance from the aperture 130. In some embodiments, the first and the second radial distance are the same.

In some embodiments, the isolator comprises two or more first attachment points 110. In some embodiments, the isolator comprises two or more second attachment points 120. The isolator 100 shown in FIG. 1 has first attachment points 110 alternately spaced between the second attachment points 120 so that the attachment points 110, 120 are equally spaced around the aperture 130. This configuration can help to evenly distribute the load through the isolator 100 in use, thus helping to reduce the stresses on the isolator 100 in use.

In some embodiments, the first attachment points 110 are oriented in an opposite direction to the second attachment points 120. Each of the first attachment points 110 of the isolator 100 shown in FIG. 1 comprises a first counterbore extending from a wider end of the first counterbore at the second side 104 of the isolator 100 to a thinner end of the first counterbore at the first side 102 of the isolator 100. Each of the second attachment points 120 of the isolator 100 shown in FIG. 1 comprise a second counterbore extending from a wider end of the second counterbore at the first side 102 of the isolator 100 to a thinner end of the second counterbore at the second side 104 of the isolator 100. The wider end 122 of the counterbore extends from the first side 102 of the isolator 100. In some embodiments, the thinner end of the first and/or second counterbores is threaded and configured to receive a corresponding threaded bolt.

In other embodiments, the first attachment points 110 and/or the second attachment points 120 may be any other shape suitable for attaching the isolator 100 to the panel and the pipe, respectively.

Figure 2:
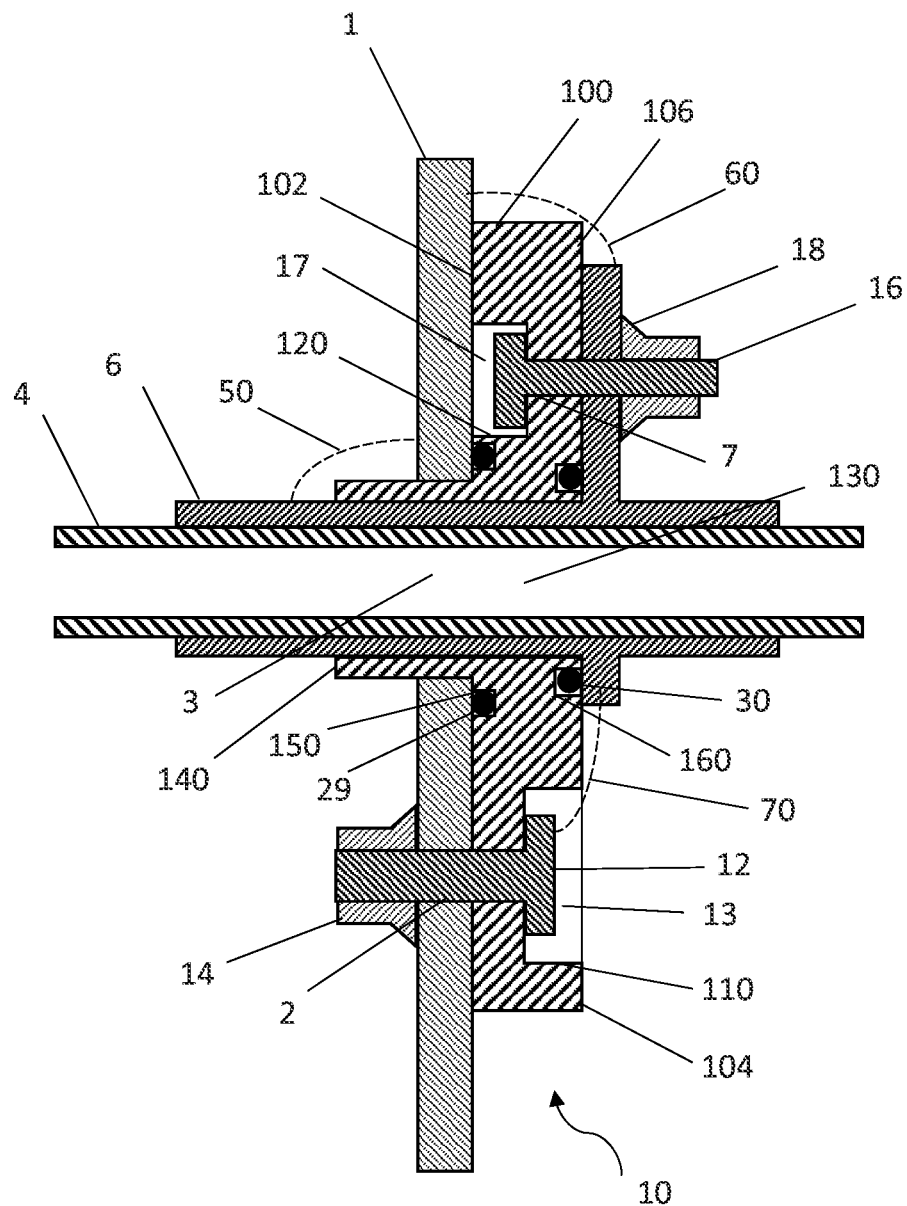
FIG. 2 shows a schematic cross-sectional view of an isolation system according to embodiments of the present invention, the isolating system comprising the isolator of FIG. 1.

The isolator 100 shown in FIG. 1 comprises a first groove 150 on the first side 102 of the isolator 100. The first groove 150 extends around the outer wall 140 of the aperture 130 and is configured to receive a first seal (not shown). In other embodiments, the first groove 150 may be omitted. In some embodiments, the isolator 100 comprises a second groove 160 (as shown in FIG. 2) on the second side 104 of the isolator 100. The second groove 160 extends around the aperture 130 and is configured to receive a second seal. In other embodiments, the second groove 160 may be omitted. In use, the first and second seals may help to prevent fuel from passing from one side of the panel to another and may help to further isolate the panel from the pipe.

The isolator 100 comprises a non-electrically conductive material. In some embodiments, the non-electrically conductive material does not react to aircraft fuel or hydraulic fluid. Such a material helps to prevent premature degradation of the isolator 100 in use, and may help to prevent contamination of the fuel due to degradation of the isolator 100. In some embodiments, the isolator 100 comprises another material that is coated by the non-electrically conductive material. In other embodiments, the isolator 100 is formed from only the non-electrically conductive material, for example the isolator 100 is machined from a block of the non-electrically conductive material or the isolator 100 is moulded from the non-electrically conductive material. In some embodiments, the isolator 100 comprises a single part. In other embodiments, the isolator 100 is formed from two or more parts rigidly fixed together, for example by a mechanical fastening or by chemical means such as an adhesive. In some embodiments, the isolator 100 is formed from a chemically inert material, for example nylon.

FIG. 2 shows a schematic cross-sectional view of an isolation system 10 according to embodiments of the present invention. The isolation system 10 comprises an isolator 100 according to embodiments of the present invention, for example the isolator 100 shown in FIG. 1. The isolation system 10 further comprises a plurality of first bolts 12 and a plurality of second bolts 16. Each bolt of the plurality of first bolts 12 is positioned in the counterbore of a respective one of the plurality of first attachments 110 of the isolator 100. Each bolt of the plurality of second bolts 16 is positioned in the counterbore of a respective one of the plurality of second attachments 120 of the isolator 100. Each of the plurality of plurality of first bolts 12 is held in position by a respective first nut 14. Each of the plurality of second bolts 16 is held in position by a respective second nut 18.

FIG. 2 shows the isolation system 10 in use. That is, the isolator 100 is positioned in an aircraft fuel tank. The isolator 100 is fastened to a pipe fitting 6, through which a pipe 4 passes, by the plurality of second bolts 16. In this embodiment, the pipe fitting 6 and the pipe 4 are electrically conductive. The outer wall 140 of the isolator 100 extends through an isolator aperture 3 of a panel 1. The panel 1 extends through the aircraft fuel tank. The isolator 100 is fastened to the panel 1 by the plurality of first bolts 12. In some embodiments, the panel 1 is an internal wall of the fuel tank and a different isolator is used at an intersection between the pipe 4 and an external wall of the fuel tank.

As can be seen in FIG. 2, the outer wall 140 of the isolator 100 is positioned between the panel 1 and the pipe fitting 6 in use. In some embodiments, such as embodiments in which the pipe fitting 6 is electrically conductive, the outer wall 140 is configured to extend from the first side 102 of the isolator 100 by a distance that exceeds the width of the panel 1 and by an additional distance that prevents an electrical arc (see dashed line 50 in FIG. 2, for example) forming between the panel 1 and the pipe fitting 6 or the pipe 4. In some embodiments, the flange 106 of the isolator 100 has a thickness that is sufficient to help prevent an electrical arc (see dashed line 60 in FIG. 2, for example) forming between the pipe panel 1 and the pipe fitting 6.

The first attachment points 110 are positioned on the flange 106 of the isolator 100 to align with corresponding panel apertures 2 in the panel 1. The second attachment points 120 are positioned on the flange 106 of the isolator 100 to align with corresponding fitting apertures 7 in the pipe fitting 6. In some embodiments, the isolator 100 is configured such that the first attachments points 110 are at a radial distance from the outer wall 140 that is sufficient to help prevent an electrical arc forming between the plurality of first bolts 12 and the pipe fitting 6 or the pipe 4 (see dashed line 70 in FIG. 2, for example).

When the plurality of first and second bolts 12, 16 are positioned in their respective counterbores, respective voids 13, 17 are formed around the head of each bolt. In some embodiments, at least one of the plurality of first and second bolts 12, 16 are electrically-conductive. In such embodiments, the system 10 comprises a non-electrically conductive sealant (not shown) covering the head of the at least one of the plurality of first and second bolts 12, 16 to seal the head of each bolt in its respective counterbore. In some embodiments, the sealant fills the void 13, 17. In some embodiments, the sealant is formed from a chemically inert material. In use, the sealant helps to prevent an electrical arc (see dashed line 70 in FIG. 2, for example) forming between the first bolts 12 and the pipe 4 and/or the pipe fitting 6 and between the second bolts 16 and the panel 1.

The isolation system 10 shown in FIG. 2 comprises an isolator 100 comprising a first groove 150 on the first side 102 of the isolator 100 and around the outer wall 140. The isolation system 10 comprises a first seal 29 located in the first groove 150 of the isolator 100. The first seal 29 surrounds the outer wall 140 of the isolator 100. By way of example only, the first seal 29 is an O-ring. In use, as shown in FIG. 2, the first seal 29 is positioned between the isolator 100 and the panel 1. The first seal 29 further helps to isolate the panel 1 from the pipe 4. The first seal 29 may also help to prevent leakage of fuel through the panel aperture 3.

In some embodiments, the isolation system 10 comprises an isolator 100 that does not comprise the first groove 150. In such embodiments, a liquid sealant or liquid gasket (not shown) may be provided between the panel 1 and the first side 102 of the isolator 100. The liquid sealant further helps to isolate the panel 1 from the pipe 4.

The isolation system 10 shown in FIG. 2 comprises an isolator 100 comprising a second groove 160 on the second side 104 of the isolator 100 and around the aperture 130. The isolation system 10 comprises a second seal 30 located in the second groove 160 of the isolator 100. The second seal 30 surrounds the aperture 130 on the second side 104 of the isolator 100. By way of example only, the second seal 30 is an O-ring. In use, as shown in FIG. 2, the second seal 30 is positioned between the isolator 100 and pipe fitting 4. The second seal 30 further helps to isolate the panel 1 from the pipe 4. The second seal 30 may also help to prevent leakage of fuel through the panel aperture 3.

In some embodiments, the isolation system 10 comprises an isolator 100 that does not comprise the second groove 160. In such embodiments, a liquid sealant or liquid gasket (not shown) may be provided between the pipe fitting 4 and the second side 104 of the isolator 100. The liquid sealant further helps to isolate the panel 1 from the pipe 4.

Figure 3:
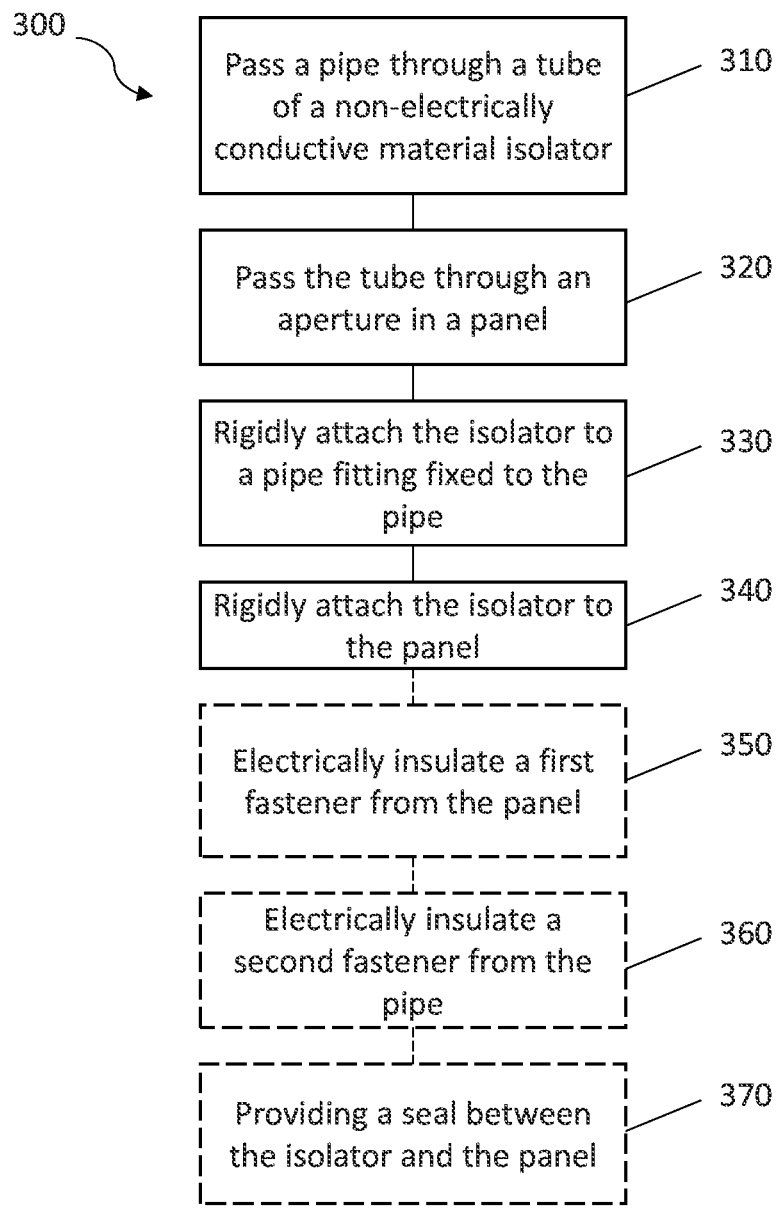
FIG. 3 is a flow diagram showing a method according to embodiments of the present invention.

FIG. 3 shows a flow diagram of a method 300 of isolating an electrically conductive internal panel or an aircraft fuel tank from an electrically conductive pipe that passes through the panel, according to embodiments of the present invention. The method 300 comprises: passing 310 the pipe through a tube of a non-electrically conductive material isolator, passing 320 the tube through an aperture in the panel, rigidly attaching 330 the isolator to a pipe fitting fixed to the pipe, and rigidly attaching 340 the isolator to the panel.

In some embodiments, the isolator is an isolator 100 according to embodiments of the present invention.

In some embodiments, the rigidly attaching 330 comprises removably rigidly attaching the isolator to the pipe fitting fixed to the pipe. In some embodiments, the rigidly attaching 340 comprises removably rigidly attaching the isolator to the panel. For example, the isolator may be attached to the pipe fitting and the panel by fasteners.

In some embodiments, the rigidly attaching 330 comprises rigidly attaching the isolator to the pipe fitting with an electrically-conductive first fastener and the method comprises electrically insulating 350 the first fastener from the panel. In some embodiments, the rigidly attaching 340 comprises rigidly attaching the isolator to the panel with an electrically-conductive second fastener and the method comprises electrically insulating 360 the second fastener from the pipe. In some embodiments, the electrical insulating 350, 360 may be achieved by providing a non-electrically conductive sealant over the first and second fasteners.

In some embodiments, the method comprises providing 370 a seal between the isolator and the panel. In some embodiments, the seal may be provided in a groove of the isolator, for example the first and/or second grooves 150, 160 of the isolator 100 shown in FIG. 2. In other embodiments, the seal may be a liquid gasket between a surface of the panel and an adjacent surface of the isolator and/or between a surface of the pipe fitting and the isolator.

Figure 4:
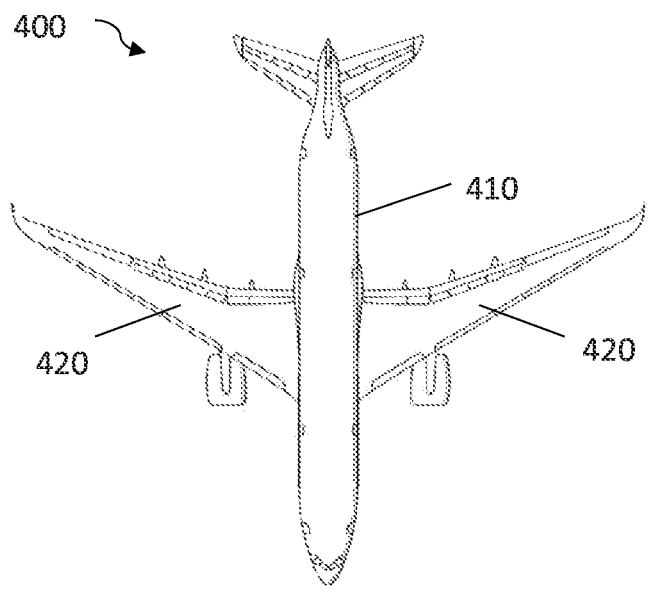
FIG. 4 shows a schematic top view of an aircraft according to embodiments of the present invention.

FIG. 4 shows a schematic top view of an aircraft 400 according to embodiments of the present invention. The aircraft 400 comprises a fuselage 410 and wings 420. In some embodiments, the wings 420 are formed from a non-electrically conductive material, for example carbon composite. In some embodiments, the wings 420 are formed from a non-electrically conductive material, for example carbon composite. In other aircraft, wings are formed from an electrically-conductive material and may not require an isolator according to the present invention because the wings themselves may dissipate an electrical current.

In some embodiments, an aircraft fuel tank is located in the wings 420. In some embodiments, the aircraft 400 comprises one or more isolators 100 according to the present invention. In some embodiments, the one or more isolators 100 are located in the aircraft fuel tank, the one or more isolators 1000 being fixed one or more respective internal panels 1 of the aircraft fuel tank. In some embodiments, the aircraft 400 comprises one or more isolation systems 10 according to embodiments of the present invention. The one or more isolation systems 10 being fixed to one or more respective internal panels 1 of the aircraft fuel tank.

It is to noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. An isolator for an aircraft fuel tank, the isolator configured to separate an electrically conductive internal panel of the fuel tank from an electrically conductive pipe that passes through the panel, the isolator comprising:
   a plurality of first attachment points configured to attach the isolator to the panel,
   a plurality of second attachment points configured to attach the isolator to the pipe, and
   an aperture defined by an outer wall and extending from a first side of the isolator to a second side of the isolator, the aperture configured to receive the pipe,
   wherein the isolator comprises a non-electrically conductive material, and
   wherein each of the plurality of first attachment points is configured to receive a fastener for fastening the isolator to the panel and each of the plurality of second attachment points is configured to receive a fastener for fastening the isolator to the pipe.

2. The isolator according to claim 1, wherein the plurality of first attachment points are oriented in an opposite direction to the plurality of second attachment points.

3. The isolator according to claim 1, wherein the plurality of first attachment points and the plurality of second attachment points are positioned on a flange extending from the outer wall of the aperture.

4. The isolator according to claim 3, wherein the flange is chamfered around the first and second attachment points.

5. The isolator according to claim 1, wherein each of the first attachment points are positioned at substantially the same radial distance from the aperture.

6. The isolator according to claim 1, wherein each of the second attachment points are positioned at substantially the same radial distance from the aperture.

7. The isolator according to claim 1, wherein each of the first and second attachment points are positioned at substantially the same radial distance from the aperture.

8. The isolator according to claim 1, wherein the first and second attachment points are alternately spaced around the aperture.

9. The isolator according to claim 1, wherein the first and second attachment points are equally spaced around the aperture.

10. The isolator according to claim 1, wherein the isolator is formed from only the non-electrically conducting material.

11. An isolation system comprising:
    the isolator according to claim 1,
    a plurality of first bolts each received by a respective first attachment point, and
    a plurality of second bolts each received by a respective second attachment point.

12. The isolation system according to claim 11, wherein at least one of the plurality of first and second bolts are electrically-conductive,
    the isolation system comprising a non-electrically conductive sealant covering the head of the at least one of the plurality of first and second bolts.

13. An aircraft comprising the isolator according to claim 1.

14. An aircraft according to claim 13, further comprising wings formed from a non-electrically conductive material.

15. An apparatus comprising:
    the isolator according to claim 1, and
    an electrically conductive pipe.

16. A method of isolating an electrically conductive internal panel of an aircraft fuel tank from an electrically conductive pipe that passes through the panel, the method comprising:
    passing the pipe through a tube of a non-electrically conductive material isolator,
    passing the tube through an aperture in the panel,
    rigidly attaching the isolator to a pipe fitting fixed to the pipe with a first fastener, the first fastener received by a first attachment point of the isolator, and
    rigidly attaching the isolator to the panel with a second fastener, the second fastener received by a second attachment point of the isolator.

17. The method according to claim 16, wherein the first and second fasteners are electrically conductive, and wherein the method comprises:
    electrically insulating the first fastener from the panel, and
    electrically insulating the second fastener from the pipe.

* * * * *